(12) United States Patent
Yao et al.

(10) Patent No.: US 11,746,202 B2
(45) Date of Patent: Sep. 5, 2023

(54) METHOD FOR MODIFYING POLYPROPYLENE RESIN MOLDED BODY, MODIFIED POLYPROPYLENE RESIN MOLDED BODY AND METHOD FOR PRODUCING SAME

(71) Applicant: Fukuoka University, Fukuoka (JP)

(72) Inventors: Shigeru Yao, Fukuoka (JP); Sho Hirai, Fukuoka (JP); Hideaki Obuchi, Fukuoka (JP); Ryoko Nakano, Fukuoka (JP); Tomohito Uchino, Fukuoka (JP)

(73) Assignee: FUKUOKA UNIVERSITY, Fukuoka (JP)

(*) Notice: Subject to any disclaimer, the term of this patent is extended or adjusted under 35 U.S.C. 154(b) by 390 days.

(21) Appl. No.: 16/967,618

(22) PCT Filed: Feb. 8, 2019

(86) PCT No.: PCT/JP2019/004578
§ 371 (c)(1),
(2) Date: Aug. 5, 2020

(87) PCT Pub. No.: WO2019/156207
PCT Pub. Date: Aug. 15, 2019

(65) Prior Publication Data
US 2021/0277165 A1    Sep. 9, 2021

(30) Foreign Application Priority Data
Feb. 9, 2018    (JP) ................. 2018-022250

(51) Int. Cl.
| | | |
|---|---|---|
| C08J 7/12 | (2006.01) | |
| C08J 7/043 | (2020.01) | |
| C08J 7/056 | (2020.01) | |
| C08F 293/00 | (2006.01) | |
| C08K 5/46 | (2006.01) | |
| C23C 18/16 | (2006.01) | |
| C23C 18/31 | (2006.01) | |

(52) U.S. Cl.
CPC ............. *C08J 7/12* (2013.01); *C08F 293/00* (2013.01); *C08J 7/043* (2020.01); *C08J 7/056* (2020.01); *C08K 5/46* (2013.01); *C23C 18/1641* (2013.01); *C23C 18/31* (2013.01); *C08J 2323/12* (2013.01); *C08J 2400/106* (2013.01)

(58) Field of Classification Search
CPC ..... C08J 7/12; C08J 7/043; C08J 7/056; C08J 2323/12; C08J 2400/106; C08F 293/00; C08K 5/46; C23C 18/1641; C23C 18/31
See application file for complete search history.

(56) References Cited

U.S. PATENT DOCUMENTS

| | | | |
|---|---|---|---|
| 9,212,333 B2 | 12/2015 | Ichikawa et al. | |
| 2010/0286317 A1* | 11/2010 | Sato ........................... | C08J 5/18 524/424 |
| 2010/0311920 A1 | 12/2010 | Gonzalez Montiel et al. | |
| 2011/0268897 A1* | 11/2011 | Klemann ................. | B41M 5/52 428/32.19 |
| 2017/0121576 A1 | 5/2017 | Bartholomew et al. | |
| 2018/0327561 A1 | 11/2018 | Yao et al. | |

FOREIGN PATENT DOCUMENTS

| | | | |
|---|---|---|---|
| CN | 1775427 A | | 5/2006 |
| CN | 101011645 A | | 8/2007 |
| JP | 2015-229725 A | | 12/2015 |
| JP | 2016-209879 A | | 12/2016 |
| JP | 2017-066200 A | | 4/2017 |
| JP | 2017-154131 A | | 9/2017 |
| WO | 2015186828 A1 | | 12/2015 |
| WO | WO 2015/196342 | * | 12/2015 |
| WO | 2017/079524 A1 | | 5/2017 |

OTHER PUBLICATIONS

Machine English translation of WO 2015/186828, Yao et al., Dec. 2015.*
PCT, International Search Report for the corresponding patent application No. PCT/JP2019/004578, dated Apr. 9, 2019, with English translation.
EPO, Extended European Search Report for the corresponding European patent application No. 19750710.6, dated Feb. 11, 2021.
Shreya Paul et al., "Blending polypropylene with glycidyl methacrylate-containing polymer to improve adhesion to elastomers," Polymer International, Aug. 1, 2008, pp. 975-981, vol. 57, No. 8.
Ryoko Nakano et al., "Polyethylene Surface Modification by Side Chain Crystalline Block Copolymer," Macromolecular Symposia, Mar. 1, 2015, pp. 44-50, vol. 349, No. 1.
CNIPA, Office Action for the corresponding Chinese patent application No. 201980012328.6, dated Apr. 24, 2022, with English translation.
Physics teaching reference materials Junior high School Book, vol. 2, Hunan Education Press, Jun. 1984, with machine translation.
Office Action for the corresponding Chinese patent application No. 201980012328.6, dated Mar. 15, 2023, with English translation.

(Continued)

*Primary Examiner* — Patrick D Niland
(74) *Attorney, Agent, or Firm* — LUCAS & MERCANTI, LLP (57) ABSTRACT

Provided is a method for modifying a polypropylene resin molded body with a side chain crystalline block copolymer having a long alkane chain in a side chain, having a good interaction force with the polypropylene resin molded body, and having a function capable of modifying surface characteristics. Also provided is a modified polypropylene resin molded body. The method for modifying a polypropylene resin molded body includes a step of contacting a copolymer solution including a side chain crystalline block copolymer with a polypropylene resin molded body at a temperature of the copolymer solution of 40 to 120° C. The modified polypropylene resin molded body includes a base material of the polypropylene resin molded body and a site that includes the side chain crystalline block copolymer in at least part of the base material.

15 Claims, 3 Drawing Sheets

(56) References Cited

OTHER PUBLICATIONS

CNIPA, Office Action for the corresponding Chinese patent application No. 201980012328.6, dated Dec. 9, 2022, with English translation.

* cited by examiner

Figure 1

Embedded resin layer / PP layer

PP modified SCCBC (Magnification × 20,000)

PP modified SCCBC (Magnification × 40,000)

Test 1            Test 2

PP fiber (1)   Modified PP fiber (1)     PP fiber (1)   Modified PP fiber (1)

Figure 4

| | Base material | After Pd generation | After Cu plating |
|---|---|---|---|
| BHA-TBAEMA |  |  |  |
| BHA-DEAEA |  |  |  |
| BHA-DMAEA |  |  |  |
| BHA-PGMA |  |  |  |

METHOD FOR MODIFYING POLYPROPYLENE RESIN MOLDED BODY, MODIFIED POLYPROPYLENE RESIN MOLDED BODY AND METHOD FOR PRODUCING SAME

CROSS REFERENCE TO RELATED APPLICATION

This Application is a 371 of PCT/JP2019/004578 filed on Feb. 8, 2019 which, in turn, claimed the priority of Japanese Patent Application No. 2018-022250 filed on Feb. 9, 2018, both applications are incorporated herein by reference.

TECHNICAL FIELD

The present invention relates to a method for modifying a polypropylene (sometimes abbreviated as PP) resin molded body, a modified polypropylene resin molded body, and a method for producing the same. Further, the present invention relates to a plating treatment method and a dyeing method of a polypropylene resin molded body using a modified polypropylene resin molded body.

BACKGROUND ART

Polyolefins such as polyethylene and polypropylene are resins widely used for containers, packaging materials, and the like because of their low cost and excellent hydrophobicity, chemical resistance, and mechanical properties. However, it is difficult to modify the surface characteristics of such resins, and their use has been limited to the range of properties inherent to the resins themselves, such as hydrophobicity.

The present inventors have provided a technology that modifies the surface characteristics of polyethylene and uses, for example, a side chain crystalline block copolymer (SCCBC) capable of imparting hydrophilicity and adhesiveness. For example, the present inventors have disclosed a surface modifier and the like that uses a side chain crystalline block copolymer, which is a block copolymer using a monomer having a long-chain alkane group and exhibiting side-chain crystallinity, and a monomer exhibiting solvent affinity (Patent Literature 1 and Patent Literature 2).

CITATION LIST

Patent Literature

Patent Literature 1: Japanese Patent Laid-Open No. 2015-229725
Patent Literature 2: Japanese Patent Laid-Open No. 2016-209879

SUMMARY OF INVENTION

Technical Problem

A side chain crystalline block copolymer having a long alkane chain in a side chain has a good interaction force with polyethylene and has a function capable of modifying surface characteristics. It is disclosed in Patent Document 1 and the like that this function can be used to modify polyethylene so as to be chemically hydrophilized or to have absorptivity with an adhesive. Modification of such polyethylenes is achieved by dipping a polyethylene base material in a dilute solution of the side chain crystalline block copolymer or by coating the polyethylene base material with the solution.

However, it has not been possible to modify polypropylene using a side chain crystalline block copolymer. Polyethylene and polypropylene are both polyolefins, but it is thought that when adhering by contacting a side chain crystalline block copolymer, the differences in structure of the polyolefins have a great influence. On the other hand, polypropylene resin molded bodies are industrially useful resins, and there is a need to modify the surface characteristics and the like of such resins.

Under such circumstances, it is an object of the present invention to provide a method for modifying a polypropylene resin molded body with a side chain crystalline block copolymer, a modified polypropylene resin molded body, and a method for producing the same.

Solution to Problem

As a result of intensive studies to solve the above-described problem, the present inventor discovered that the following invention meets the object described above, thereby arriving at the present invention.

That is, the present invention relates to the following.

<1> A method for modifying a polypropylene resin molded body, comprising a step of contacting a copolymer solution including a side chain crystalline block copolymer with a polypropylene resin molded body at a temperature of the copolymer solution of 40 to 120° C.

<2> The method for modifying a polypropylene resin molded body according to <1>, wherein the side chain crystalline block copolymer is a copolymer of a first monomer (A) and a second monomer (B), the monomer (A) is any monomer selected from the group consisting of (meth) acrylate, (meth)acrylamide, vinyl ether, vinyl ester, siloxane, α-olefin, and substituted styrene, having an alkane chain with a length of 8 or more carbon atoms in a side chain thereof,
the monomer (B) is a monomer having a functional group, and
the side chain crystalline block copolymer is a block copolymer having a monomer (A)-derived polymerized block, which is a polymerized portion of the monomer (A), and a monomer (B)-derived polymerized block, which is a polymerized portion of the monomer (B).

<3> The method for modifying a polypropylene resin molded body according to <1> or <2>, wherein a solvent of the copolymer solution is at least one or more solvents selected from the group consisting of an aromatic hydrocarbon solvent, a halogenated aromatic hydrocarbon solvent, an alcohol solvent, an ether solvent, a ketone solvent, an amide solvent, an ester solvent, an aliphatic hydrocarbon solvent, a halogenated aliphatic hydrocarbon solvent, dimethyl sulfoxide, and an ionic liquid.

<4> The method for modifying a polypropylene resin molded body according to any of <1> to <3>, wherein the copolymer of the copolymer solution has a concentration of 0.01 to 2.0% by mass.

<5> The method for modifying a polypropylene resin molded body according to any of <1> to <4>, wherein the polypropylene resin molded body is contacted with the copolymer solution at the temperature of the copolymer solution for a time of 1 second to 60 minutes.

<6> The method for modifying a polypropylene resin molded body according to <2>, wherein the functional group of the monomer (B) is a functional group having a polar group and/or a metal adsorbability.

<7> The method for modifying a polypropylene resin molded body according to <6>, wherein the monomer (B) is a monomer having, as a functional group having a polar group, any group selected from the group consisting of an oxyalkylene group, an amino group, an amide group, and a sulfo group.

<8> The method for modifying a polypropylene resin molded body according to <6>, wherein the monomer (B) is any monomer selected from the group consisting of (meth)acrylate, (meth)acrylamide, vinyl ether, vinyl ester, siloxane, α-olefin, and substituted styrene, having, as a functional group having a metal adsorbability, an amine in a side chain thereof.

<9> The method for modifying a polypropylene resin molded body according to <6>, wherein the monomer (B) is any monomer selected from the group consisting of (meth)acrylate, (meth)acrylamide, vinyl ether, vinyl ester, siloxane, α-olefin, and substituted styrene, having an oxiranyl group in a side chain thereof.

<10> The method for modifying a polypropylene resin molded body according to <9>, wherein a compound having a tertiary amine is reacted with the oxiranyl group derived from the monomer (B) of the side chain crystalline block copolymer to form a part of the oxiranyl group into a tertiary amine side chain serving as a functional group having a metal adsorbability.

<11> The method for modifying a polypropylene resin molded body according to <6>, wherein the monomer (B) is any monomer selected from the group consisting of (meth)acrylate, (meth)acrylamide, vinyl ether, vinyl ester, siloxane, α-olefin, and substituted styrene, having, as a functional group having a metal adsorbability, an oxyalkylene group in a side chain thereof.

<12> A method for performing a plating treatment on a polypropylene resin molded body, comprising:
a surface layer catalyzing step of providing a nanometal layer on a polypropylene resin molded body modified by the method for modifying a polypropylene resin molded body according to any of <8> to <11> by contacting the polypropylene resin molded body with a nanometal dispersion; and
a plating treatment step of providing a plating treatment layer on the polypropylene resin molded body with the nano metal layer arranged there-between by performing an electroless plating treatment on the polypropylene resin molded body provided with the nano metal layer.

<13> A method for dyeing a polypropylene resin molded body, comprising a dyeing step of providing a dye adhesion site in a polypropylene resin molded body modified by the method for modifying a polypropylene resin molded body according to any of <1> to <11> by contacting the polypropylene resin molded body with a dye.

<14> A method for producing a modified polypropylene resin molded body, comprising a step of contacting a copolymer solution including a side chain crystalline block copolymer with a polypropylene resin molded body at a temperature of the copolymer solution of 40 to 120° C.

<15> A modified polypropylene resin molded body comprising a base material of a polypropylene resin molded body and a site including a side chain crystalline block copolymer in at least a part of the base material.

<16> The modified polypropylene resin molded body according to <15>, wherein the site including the side chain crystalline block copolymer in at least a part of the base material remains after the side chain crystalline block copolymer comes into contact with a good solvent.

<17> The modified polypropylene resin molded body according to <15> or <16>, wherein the site including the side chain crystalline block copolymer contains a good solvent for the side chain crystalline block copolymer.

Advantageous Effects of Invention

According to the present invention, a polypropylene resin molded body can be modified by a side chain crystalline block copolymer. As a result, for example, various surface characteristics, such as hydrophilicity and absorptivity to an adhesive, can be imparted. In addition, the polypropylene resin molded body can also be plated or dyed.

DESCRIPTION OF EMBODIMENTS

Hereinafter, embodiments of the present invention will be described in detail. However, the description of the constituent elements described below is an example (representative example) of the embodiments of the present invention, and the present invention is not limited to the following subject matter unless the spirit thereof is changed. In addition, when the word "to" is used in this specification in relation to a numerical range, both numerical values are included in that range.

The method for modifying a polypropylene resin molded body of the present invention comprises a step of contacting a copolymer solution including a side chain crystalline block copolymer with a polypropylene resin molded body at a temperature of the copolymer solution of 40 to 120° C. According to the method for modifying a polypropylene resin molded body of the present invention, the polypropylene resin molded body can be modified by the side chain crystalline block copolymer. In the present application, the expression "method for modifying a polypropylene resin molded body of the present invention" may be simply referred to as the "modification method of the present invention".

The present invention can also provide a method for producing a modified polypropylene resin molded body comprising a step of contacting a copolymer solution including a side chain crystalline block copolymer with a polypropylene resin molded body at a temperature of the copolymer solution of 40 to 120° C. A polypropylene resin molded body modified by the method for producing a modified polypropylene resin molded body of the present invention can be obtained. In the present application, "method for producing a modified polypropylene resin molded body of the present invention" may be simply referred to as the "production method of the present invention".

A modified polypropylene resin molded body of the present invention comprises a base material of a polypropylene resin molded body and a site including a side chain crystalline block copolymer in at least a part of the base material. A site including this side chain crystalline block copolymer is formed in the base material when contacted with a solvent. The modified polypropylene resin molded body of the present invention is modified by the side chain crystalline block copolymer, and a functionality is imparted by the side chain crystalline block copolymer. In the present application, "modified polypropylene resin molded body of the present invention" may be simply referred to as the "molded body of the present invention".

It is also note that in the present application, the production method of the present invention can also be carried out by the modification method of the present invention, the molded body of the present invention can be obtained by being modified by these methods, and the constitutions corresponding to each of those in the present application can be mutually used.

Conventionally, it has not been possible to modify polypropylene with a side chain crystalline block copolymer. On the other hand, mixed resins obtained by kneading or laminating polyethylene and polypropylene are widely used. As a result of detailed investigations into the physical properties of polyethylene and polypropylene, the present inventors found that these mixed resins compatibilize in a melt state during a molding step, for example, and form a mixed resin as a dispersed mixture having an interface adhesiveness. The present inventors focused on this compatibility phenomenon in the melt state in the modification of polypropylene Further, when the polypropylene resin molded body was dipped in a solution of the side chain crystalline block copolymer, and contacted with the solution in a state in which the temperature of the solution had been increased to about 40 to 120° C., it was possible to obtain a modified molded body having a site including a side chain crystalline block copolymer in the surface layer of the polypropylene resin molded body. The polypropylene crystals of the surface layer may slightly melt in the heated solvent. By contacting with the side chain crystalline block copolymer in a solvent having a lower temperature than the temperature at which this melting substantially occurs, it is thought that a phenomenon similar to the compatibility phenomenon of polyethylene and polypropylene in a melt state occurs, and a site having excellent adhesiveness is formed. The present invention is based on such knowledge.

[Side Chain Crystalline Block Copolymer]

The present invention uses a side chain crystalline block copolymer. The side chain crystalline block copolymer in the present invention is a block copolymer of a polymer exhibiting crystallinity in a side chain and a polymer exhibiting a modification effect. The side chain crystalline block copolymer is a copolymer that is capable of forming a site in which a part of the block copolymer is compatibilized with the surface layer of the base material of the polypropylene resin molded body. In the present application, "side chain crystalline block copolymer in the present invention" may be simply referred to as the "copolymer of the present invention".

The copolymer of the present invention is a copolymer of a first monomer (A) and a second monomer (B), wherein the monomer (A) can be any monomer selected from the group consisting of (meth)acrylate, (meth)acrylamide, vinyl ether, vinyl ester, siloxane, α-olefin, and substituted styrene, having an alkane chain with a length of 8 or more carbon atoms in a side chain thereof, and the monomer (B) can be a monomer having a functional group corresponding to the modification purpose in a side chain thereof.

[First Monomer (A)]

The copolymer of the present invention uses a first monomer (A) selected in order to obtain a side chain crystalline block copolymer that exhibits adhesiveness with polypropylene. Further, the copolymer of present invention has a structural unit derived from this monomer (A). The monomer (A) is a crystalline monomer that forms a unit having a side chain that when the copolymer is formed compatibilizes with polypropylene and exhibits adhesiveness.

As the first monomer (A), it is preferable to use any monomer selected from the group consisting of (meth)acrylate, (meth)acrylamide, vinyl ether, vinyl ester, siloxane, α-olefin, and substituted styrene, having an alkane chain with a length of 8 or more carbon atoms in a side chain thereof. The adhesiveness with the polypropylene resin molded body can be adjusted according to the number of carbon atoms and the structure of the side chain. In the present application, the term "(meth)acrylate" means both acrylate and methacrylate. Similarly, "(meth)acrylamide" means both acrylamide and methacrylamide.

When an alkane chain is used as the side chain, the number of carbon atoms of that alkane chain is preferably 8 or more. The number of carbon atoms may be 10 or more, 12 or more, or even 14 or more. The alkane chain is preferably a linear alkane chain. On the other hand, the upper limit of the number of carbon atoms can be appropriately set within a range that allows polymerization to the copolymer and enables the adhesiveness with polypropylene to be maintained. In practice, specifically, the upper limit may be 50 or less, 40 or less, or 30 or less. If the alkane chain is too large, the copolymer may not have an appropriate steric structure, and it may be difficult to set the polymerization conditions.

Examples of specific monomers having such a side chain include (meth)acrylates having an alkyl group having any side chain selected from the group consisting of a decyl group, a dodecyl group, a tridecyl group, a tetradecyl group, a hexadecyl group, a stearyl group, a docosyl group, and a behenyl group. For these monomers, the polymerization reaction conditions of the copolymer of the present invention can be easily set, and a copolymer obtained using such a monomer can easily form a unit that compatibilizes with polypropylene resin and exhibits adhesiveness.

The monomer (A) used in the copolymer of the present invention is any monomer selected from the group consisting of (meth)acrylate, (meth)acrylamide, vinyl ether, vinyl ester, siloxane, α-olefin, and substituted styrene, having the above-described alkane side chain. These structures such as (meth)acrylate, (meth)acrylamide, vinyl ether, vinyl ester, siloxane, α-olefin, and substituted styrene form the main chain of the structure derived from the monomer (A) of the copolymer.

[Second Monomer (B)]

The monomer (B) used in the copolymer of the present invention is characterized by having a functional group. The term "functional group" as used herein refers to a group having a function of modifying polypropylene resin when used as the copolymer of the present invention due to the presence of a large number of groups derived from the monomer (B) in the copolymer even after polymerization. Examples of functions imparted when the polypropylene resin is modified include, mainly, hydrophilicity, ionic conductivity, adhesiveness, dyeability, metal adsorbability, heavy metal supportability, organic solvent affinity, and the like. The functional group included in the monomer (B) is a structure corresponding to these functions.

(Functional Group Having a Polar Group)

The functional group is preferably a functional group having a polar group because when a copolymer obtained by using a monomer (B) having a functional group having a polar group is used as a modifying agent for polypropylene resin, the characteristics of the polypropylene resin modified by that modifying agent are very different from those of a normal polypropylene resin.

The term "polar group" as used herein refers to an atomic group having polarity that forms a polar structure in the polymer of the copolymer due to the presence of that group in a copolymer obtained using a monomer having the group. Examples of typical polar groups include an amino group, a carboxy group (—COOH), a hydroxy group (—OH), a carbonyl group (—CO—), an ether group (—O—), a sulfo group (—$SO_3$H), an ester group (—COO—), an amide group (—CON—), and the like.

In the monomer (B), the functional group, particularly the functional group having polarity, may be present as a main chain structure of the monomer or may be present as a side chain, and is appropriately selected in consideration of the function to be imparted or the ease of polymerization of the copolymer. The monomer (B) exhibits a predetermined function by being copolymerized with the monomer (A). The unit in which the monomer (B) is polymerized is for exhibiting a function that the polypropylene resin does not have. For example, to impart hydrophilicity, a structure having an ether group in the main chain, such as a polyvinyl alcohol exhibiting high hydrophilicity, can be provided.

Further, even if the main chain itself has hardly any functional groups, a monomer may be used that has a functional group in the portion corresponding to the side chain when it is made into a copolymer. In the case of using a structure having a functional group in a side chain, the structure of the main chain is not particularly limited as long as it can form a copolymer. For example, (meth)acrylate, (meth)acrylamide, vinyl ether, vinyl ester, siloxane, α-olefin, substituted styrene, and the like may be employed.

The monomer (B) used in the copolymer of the present invention is preferably a monomer having any group selected from the group consisting of an oxyalkylene group, an amino group, an amide group, and a sulfo group. It is possible to use a monomer or the like in which these substituents are appropriately bonded to a structure serving as the main chain either directly or via an alkylene having about 1 to 5 carbon atoms or 1 to 3 carbon atoms. In particular, these structures correspond to the function desired to be imparted to the polypropylene resin. When these structures are present as a group of the copolymer of the polymer, the functions of those structures can be exhibited.

(Functional Group Having Metal Adsorbability)

The copolymer of the present invention can use a second monomer (B) selected such that a plating layer is easily formed with the side chain crystalline block copolymer arranged there-between when plating is performed. When the copolymer to be used in the present invention is a copolymer suitable for plating, the monomer (B) is a monomer having in a side chain a functional group for imparting a metal adsorbability. The term "metal adsorbability" as used herein refers to a property exhibiting adsorption characteristics with a metal or metal ions due to the molecular structure having a polar group, chemically bonding with a metal or metal ions, and when a molecular structure that tends to form a complex is provided in the copolymer, supporting and adsorbing or holding a metal or metal ions due to that structure being arranged on a surface layer of the object to be treated (for example, molded body of polypropylene resin).

Examples of specific molecular structures exhibiting a metal adsorbability include amines, chelates, and the like. A compound having a copolymer main chain structure in which these structures become a side chain can be used as the monomer (B). Alternatively, a compound capable of modifying the side chain of the monomer (B) into a metal adsorbing structure (for example, an above-described amine or chelate) after the copolymer of the monomer (A) and the monomer (B) is formed can also be used.

In this modification, the side chain derived from the monomer (B) immediately after polymerization becomes a reactive group, which reacts with the compound that will become a side chain having a metal adsorbability, thereby enabling a metal adsorbability to be achieved. When a chelate is used as a side chain, a so-called chelate resin side chain structure can be used. The chelate resin can adjust a complex forming ability with a metal element based on the structure of the functional group. The formation of a complex enables a metal to be adsorbed. For example, the monomer (B) can be selected such that the structure of the chelate resin has various functional groups, such as iminodiacetic acid (IDA) group, a low molecular weight polyamine group, an aminophosphate group, an isothionium group, a dithiocarbamic acid group, and a glucamine group.

(Oxyalkylene Group)

The monomer (B) may have an oxyalkylene group. As used herein, the "oxyalkylene group" is a group represented by the general formula ($C_nH_{2n}O$). In this general formula, n is preferably an integer of 1 to 10. For example, when n is 1, oxyalkylene group is called oxymethylene ($CH_2O$), and when n is 2, the oxyalkylene group is called dioxyethylene ($CH_2CH_2O$). When a plurality of these oxyalkylene groups are connected, the oxyalkylene group is called a polyoxyalkylene group (general formula, $(C_nH_{2n}O)_m$). An example of a typical linear polyoxyalkylene group $(((CH_2)_nO)_m)$ is polyoxyethylene $((CH_2CH_2O)_m)$. By employing a polypropylene resin modifying agent obtained by using a monomer having such an oxyalkylene group or polyoxyalkylene group as a main chain or a side chain as the second monomer (B) to prepare a copolymer, it is possible to impart hydrophilicity, ionic conductivity of Li and the like, adhesiveness, dyeability, metal adsorbability, heavy metal supportability, and organic solvent affinity to the polypropylene resin.

The copolymer can be produced by using, as the monomer (B) having an oxyalkylene group, any monomer selected from the group consisting of (meth)acrylate, (meth)acrylamide, vinyl ether, vinyl ester, siloxane, α-olefin, and substituted styrene, having an oxyalkylene group in a side chain thereof. A copolymer using this monomer can impart hydrophilicity, ionic conductivity, adhesiveness, dyeability, metal adsorbability, heavy metal supportability, organic solvent affinity, and the like to the polypropylene resin. Further, by using such a copolymer, excellent plating adhesiveness to a resin molded body can be achieved.

Examples of monomers having a polyoxyalkylene group in a side chain include di(ethylene glycol)ethyl ether acrylate ($CH_2$=$CH(CO)O(CH_2$—$CH_2$—O—$)_2C_2H_5$), polyethylene glycol-monoacrylate ($CH_2$=$CH(CO)O(CH_2$—$CH_2$—O—$)_nH$) (preferably n is 2 to 10), methoxy-polyethylene glycol-acrylate ($CH_2$=$CH(CO)O(CH_2$—$CH_2$—O—$)_nCH_3$) (preferably n is 2 to 9), and the like.

(Amino Group)

Further, the monomer (B) may have an amino group. This amino group exists as an amine in the structure of the copolymer of the present invention after polymerization. As used herein, "amine" is a general term for compounds in which a hydrogen atom of ammonia has been replaced with a hydrocarbon group. An amino group in which one hydrogen has been substituted is called a "primary amine", an amino group in which two hydrogens have been substituted is called a "secondary amine", an amino group in which three hydrogens have been substituted is called a "tertiary amine", and an amino group in which an alkyl group has been bonded to a tertiary amine is called a "quaternary ammonium ion". Due to the presence of these various amines in the copolymer of the present invention as a structure derived from the monomer (B), functions such as hydrophilicity, ionic conductivity, adhesiveness, dyeability, metal adsorbability, heavy metal supportability, and organic solvent affinity can be exhibited. Further, by using such a copolymer having various amines, excellent plating adhesiveness to the resin molded body can be achieved. When used for plating or the like, it is particularly preferable to use a monomer having a tertiary amine.

Preferable examples of the monomer (B) specifically include any monomer selected from the group consisting of (meth)acrylate, (meth)acrylamide, vinyl ether, vinyl ester, siloxane, α-olefin, and substituted styrene, having a secondary or a tertiary amine. In these monomers, the amine serves as a side chain of the copolymer, thereby exhibiting hydrophilicity, ionic conductivity, adhesiveness, dyeability, metal adsorbability, heavy metal supportability, organic solvent affinity, and the like. In addition, any selected from the group consisting of (meth)acrylate, (meth)acrylamide, vinyl ether, vinyl ester, siloxane, α-olefin, and substituted styrene forms the main chain of the copolymer.

In particular, in order to exhibit these functions, it is preferable to use a monomer having a secondary, tertiary, or quaternary amine in the side chain of the monomer (B). More specifically, the amino group is a substituent having a structure represented by "—N(R1) (R2)", wherein R1 and R2 are each independently H or a hydrocarbon. The number of carbon atoms in this hydrocarbon can be, for example, 1 to 4. Further, it is possible to use a monomer in which these substituents are bonded as appropriate to any of a (meth) acrylate, (meth)acrylamide, vinyl ether, vinyl ester, siloxane, α-olefin, and substituted styrene via an alkylene having about 1 to 5 carbon atoms, or about 1 to 3 carbon atoms. Examples include 2-(dimethylamino)ethyl methacrylate (DMAEMA), 2-(dimethylamino)ethyl acrylate (DMAEA), 2-(diethylamino)ethyl methacrylate (DEAEMA), 2-(diethylamino) ethyl acrylate (DEAEA), 2-(tert-butylamino) ethyl methacrylate (TBAEMA), and the like.

(Amide Group)

Further, the monomer (B) may have an amide group. In addition, it is possible to use a monomer or the like in which the amide group is appropriately bonded to a structure serving as the main chain either directly or via an alkylene having about 1 to 5 carbon atoms or 1 to 3 carbon atoms. A copolymer using this monomer can impart hydrophilicity, ionic conductivity, adhesiveness, dyeability, metal adsorbability, heavy metal supportability, organic solvent affinity, and the like to the polypropylene resin. Specific examples of the monomer having an amide group in the side chain include N,N-dimethylacrylamide (DMAA), N,N-dimethylaminopropyl acrylamide (DMAPAA), N,N-diethylacrylamide (DEAA), and the like.

(Sulfo Group)

Further, the monomer (B) may have a sulfo group. In addition, it is possible to use a monomer or the like in which the sulfo group is appropriately bonded to a structure serving as the main chain either directly or via an alkylene having about 1 to 5 carbon atoms or 1 to 3 carbon atoms. A copolymer using this monomer can impart hydrophilicity, proton conductivity, ionic conductivity, adhesiveness, dyeability, metal adsorbability, heavy metal supportability, organic solvent affinity, and the like to the polypropylene resin. Specific examples of the monomer having a sulfo group include vinyl sulfonic acid, 2-((methacryloyloxy) ethanesulfonic acid, ATBS (acrylamide tertiary butyl sulfonic acid) and its sodium salt, ATBSNa, and the like.

(Oxiranyl Group)

Moreover, preferable examples of the monomer (B) include any monomer selected from the group consisting of (meth)acrylate, (meth)acrylamide, vinyl ether, vinyl ester, siloxane, α-olefin, and substituted styrene, having an oxiranyl group.

A copolymer obtained using these monomers has an oxiranyl group in a side chain. Reacting a compound having a tertiary amine, such as iminodiacetic acid, with the oxiranyl group of the side chain as a reactive group produces a tertiary amine structure derived from iminodiacetic acid in the side chain. This structure has a metal adsorbability. A more specific plating method is described later.

[Block Copolymer]

The copolymer of the present invention is a copolymer of the above-described monomer (A) and monomer (B). The copolymer of the present invention is a block copolymer, and this block copolymer may be a diblock copolymer, a triblock copolymer, or the like. Further, in the method for producing the copolymer of the present invention as well, it is preferable that the block copolymer be produced such that a monomer (A)-derived polymerized block, which is a polymerized portion of the monomer (A), and a monomer (B)-derived polymerized block, which is a polymerized portion of the monomer (B), are bonded while forming their respective block. By using the block copolymer, the functions of each of the structural unit of the monomer (A) and the structural unit of the monomer (B) tend to be sufficiently exhibited. The copolymer of the monomer (A) and the monomer (B) can be polymerized by a known technique, such as various living polymerization methods (radical, anion, cation). As the living radical polymerization method, the NMP method, ATRP method, RAFT method, or the like can be used.

For example, in the case of imparting hydrophilicity to a polypropylene resin molded body, the monomer (A) is selected in the step of selecting the monomer (A) having a side chain exhibiting adhesiveness to the polypropylene resin molded body to be modified. Further, the monomer (B) is selected in the step of selecting the second monomer (B) for imparting hydrophilicity. Then, a monomer (A) mixed solution preparation step is performed by mixing the selected monomer (A) with a polymerization solvent together with an initiator to prepare a monomer (A) mixed solution. Next, a monomer (A) polymerization step is performed based on the polymerization mechanism of the initiator, such as living radical polymerization, under a nitrogen atmosphere or the like while appropriately stirring the monomer (A) mixed solution prepared in the mixed solution preparation step in a reactor at an appropriate polymerization temperature (for example, about 90 to 120° C.), to thereby obtain a monomer (A) block polymer. Then, a monomer (B) polymerization step is performed by mixing the separately-selected monomer (B) in the solution in which the block polymer of the monomer (A) is mixed to further polymerize the monomer (B) by the radicals in the solution. This enables a block copolymer having a monomer

(A)-derived block and a monomer (B)-derived block to be obtained. The order for carrying out the polymerization of the monomer (A) and the polymerization of the monomer (B) may be changed depending on the kind and molecular weight of monomers to be polymerized, the polymerization conditions of each monomer, and the like.

In the copolymer of the present invention, it is preferable that the molecular weight (g/mol) corresponding to the structure derived from the first monomer (A) and the molecular weight (g/mol) corresponding to the structure derived from the second monomer (B) are each 500 or more. By setting the molecular weight corresponding to the structure derived from the first monomer (A) to 500 or more, the polypropylene resin molded body serving as the base material can exhibit stronger adhesiveness. The molecular weight corresponding to the structure derived from the first monomer (A) is preferably 1,000 or more, and more preferably 2,000 or more.

Further, by setting the molecular weight corresponding to the structure derived from the second monomer (B) to 500 or more, a copolymer having a sufficient structure for imparting better functionality can be obtained. The molecular weight corresponding to the structure derived from the second monomer (B) is preferably 1,000 or more, and more preferably 2,000 or more. The copolymer may be composed of the first monomer (A) and the second monomer (B), and as long as the object of the present invention is not impaired, may further contain other monomers. It is noted that these molecular weights are values "Mw: weight average molecular weight" that can be determined in terms of polystyrene from results obtained by GPC. In addition, since the structure derived from the monomer (A) hardly dissolves in a solvent, it may be difficult to measure the molecular weight. In such a case, each molecular weight can be calculated by a technique such as elemental analysis, IR, or NMR.

An example of the copolymer of the present invention is a polymer represented by the following chemical formula (I). This polymer is a block copolymer obtained by polymerizing behenyl acrylate (BHA: the alkane chain of the side chain is a linear alkyl group having 22 carbon atoms) as the monomer (A), and then copolymerizing with 2-(tert-butylamino) ethyl methacrylate (TBAEMA) as the monomer (B). This is a so-called AB type block copolymer. This copolymer has a block copolymer site that exhibits adhesiveness to a polypropylene resin molded body due to the structure derived from BHA as the monomer (A), while also having an amino group structure derived from TBAEMA as the monomer (B). As a result, a metal adsorbability can be imparted to a base material (object to be treated), such as a polypropylene resin molded body. In chemical formula (I), n is preferably 2 to 1,000 and m is preferably about 2 to 1,000. This n is more preferably 5 or more or 10 or more in order to more stably bond with the polypropylene resin molded body. On the other hand, this m is selected according to the level of metal adsorbability, and is more preferably 5 or more or 10 or more in order to obtain a more stable modification effect. These n and m may be 800 or less or 500 or less, respectively, within a range in which their respective effects can be sufficiently obtained.

[Formula 1]

[Polypropylene Resin Molded Body]

The present invention can be applied to all polypropylene resin molded bodies (molded articles). As used herein, "polypropylene resin molded body" refers to a molded body containing a resin (polymer) obtained by polymerizing propylene. As the polypropylene resin molded body, it is possible to use a molded body using a polypropylene resin obtained by copolymerizing polypropylene with another structure from a molded body having a high polypropylene resin concentration. As the polypropylene, a homopolymer of polypropylene, or a block copolymer or random copolymer in which ethylene is copolymerized can be used. Further, there can also be used a molded body or the like obtained using a mixture appropriately containing a polyolefin or other such resin other than polypropylene, and a functionalizing agent such as a molding aid, a pigment, and an ultraviolet absorber, in a state in which some impurities or the like are also included.

In the present invention, within the range that can be modified according to the present invention, these polypropylene resin molded bodies can be selected as the base material to be modified. Further, modification suitable for various polypropylene resin molded bodies can be carried out by appropriately selecting the monomer (A), the monomer (B), the solvent for coating with the copolymer according to the present invention, and the like, according to the state, the structure, and the like thereof.

Further, the molding form of the molded body is not particularly limited. Examples of the molding form include a molded body such as a sheet, a plate, a fiber, and a porous material. It is possible to modify not only the surface, namely, the surface layer, of the molded body, but also the whole of a porous material by dipping even the inner portions, such as inside the pores. The polypropylene resin molded body can be produced so as to have very good plating stability by using, in particular, a molded body mainly consisting of polypropylene (for example, containing 50% by mass or more).

The modified polypropylene resin molded body obtained by the present invention has the characteristics of the side chain crystalline block copolymer. This modified polypropylene resin molded body can be used for conventional resin molded body applications, and it is expected that applications utilizing its modified characteristics will be expanded. At that time, in view of the fact that the polypropylene resin molded body may be in the form of various structures, such as a sheet, a film, or a fiber polypropylene resin molded body, the polypropylene resin molded body may be formed into various shapes utilizing its diversity as a molded body.

[Modification]

The modification method of the present invention comprises a step of contacting a copolymer solution containing a side chain crystalline block copolymer in a solvent with a polypropylene resin molded body at a temperature of the copolymer solution of 40 to 120° C. As a result of the heated contact at a predetermined temperature, the polypropylene surface and the side chain exhibiting crystallinity derived from the monomer (A) of the copolymer of the present invention compatibilize to form a site exhibiting adhesiveness, thereby enabling the polypropylene to be modified. Further, the production method of the present invention can obtain a modified polypropylene resin molded body.

[Solution Preparation]

In the present invention, a copolymer solution in which a side chain crystalline block copolymer is dissolved in a solvent is used. In the present application, depending on the blocks of the copolymer, complete dissolution for a copolymer solution may be difficult. Therefore, the present invention will be described as a concept including dispersion/suspension in addition to dissolution, and the term "solution" encompasses "suspension" and "dispersion".

As the solvent of the copolymer solution, a good solvent of a copolymer capable of dissolving or dispersing the copolymer can be used. As described above, in the present invention, a copolymer solution having a predetermined temperature is contacted with the polypropylene resin molded body. As a result of this contact, the copolymer of the present invention and the polypropylene resin molded body compatibilize. Therefore, when a solvent capable of partially swelling polypropylene is used in a state in which the copolymer is sufficiently dissolved or dispersed, compatibilization occurs sufficiently. Further, it is preferable that the solvent does not volatilize too much at the contact temperature.

Examples of such a solvent include one or more solvents selected from the group consisting of an aromatic hydrocarbon solvent, a halogenated aromatic hydrocarbon solvent, an alcohol solvent, an ether solvent, a ketone solvent, an amide solvent, an ester solvent, an aliphatic hydrocarbon solvent, a halogenated aliphatic hydrocarbon solvent, dimethyl sulfoxide, an ionic liquid, and the like. These solvents can be used alone or in an appropriate mixture. More specifically, examples include the following solvents.

The aromatic hydrocarbon solvent preferably has 6 to 20 carbon atoms, and more preferably 6 to 10 carbon atoms. Examples thereof include toluene, xylene (o-xylene, m-xylene, p-xylene, and mixtures thereof), mesitylene, ethylbenzene, cyclohexylbenzene, and the like.

The halogenated aromatic hydrocarbon solvent preferably has 6 to 20 carbon atoms, and more preferably 6 to 10 carbon atoms. Examples thereof include chlorobenzene, dichlorobenzene, trichlorobenzene, bromobenzene, fluorobenzene, and the like.

Examples of the alcohol solvent include ethylene glycol, glycerin, 2-methoxyethanol, 2-ethoxyethanol, and the like.

Examples of the ether solvent include tetrahydrofuran, 1,4-dioxane, dimethoxyethane, cyclopentyl methyl ether, diglyme, anisole, methylanisole, dimethoxybenzene, and the like.

Examples of the ketone solvent include methyl isobutyl ketone, cyclohexanone, acetophenone, and the like.

Examples of the amide solvent include N,N-dimethylacetamide, N,N-dimethylformamide, N-methyl-2-pyrrolidone, and the like.

Examples of the ester solvent include ethyl acetate, butyl acetate, methyl benzoate, and the like.

The aliphatic hydrocarbon solvent preferably has 5 to 30 carbon atoms, and more preferably 6 to 15 carbon atoms. Examples thereof include pentane, hexane, octane, decane, cyclohexane, decalin, and the like.

The halogenated aliphatic hydrocarbon solvent preferably has 1 to 10 carbon atoms, and more preferably 1 to 5 carbon atoms. Examples thereof include trichloromethane, tetrachloromethane, dichloroethane, trichloroethylene, tetrachloroethylene, chlorobutane, bromoform, and the like.

Examples of the ionic liquid include ammonium salts, imidazolium salts, and the like. Examples of the ammonium salt-based ionic liquid include tetrabutylammonium acetate, dodecyltrimethylammonium chloride, tetrahexylammonium bromide, and the like. Examples of the imidazolium salt-based ionic liquid include 1-butyl-3-methyl-imidazolium chloride, 1-butyl-3-methyl-imidazolium methylsulfate, 1-butyl-3-methyl-imidazolium iodide, and the like.

More preferably, toluene, xylene, butyl acetate, octane, or decalin can be used as the solvent.

The solvent is preferably a liquid at 1 atm and 25° C. As the solvent, a solvent having a boiling point of 40° C. or more at 1 atm is preferable, and a solvent having a boiling point of 85° C. or more is more preferable. Since the solvent is heated in the contacting step, the solvent may volatilize. Due to this volatilization, the copolymer solution may be refluxed in order to suppress a change in the liquid volume and a change in the concentration. When the boiling point of the solvent is low, it is necessary to further improve the reflux function, which may reduce operability. Therefore, the boiling point should be in the higher end within the above-described range. On the other hand, it is not necessary to set an upper limit for the boiling point.

The solvent of the copolymer solution may be either a single solvent or a mixed solvent. When a mixed solvent is used, it is preferable to use any of toluene, xylene, butyl acetate, octane, or decalin as a main solvent. The solvent used as the main solvent is preferably 50% by volume or more, and may be 70% by volume or more, 90% by volume or more or 95% by volume, of the total volume of the solvent.

The copolymer concentration in the copolymer solution may be appropriately set according to the type of the copolymer, the temperature at which the copolymer solution is contacted with the polypropylene resin molded body, the amount of adhesion or adhesive film thickness of the copolymer, the purpose of modification, and the like. The copolymer concentration in the copolymer solution is preferably 0.01 to 2.0% by mass. The lower limit of the copolymer solution concentration is preferably 0.02% by mass or more, and more preferably 0.05% by mass or more. If the concentration is too low, the modification effect may be insufficient due to insufficient formation of the site that includes the copolymer in the base material. The upper limit of the copolymer solution concentration is preferably 1.5% by mass or less, and more preferably 1.0% by mass or less. The lower limit may be 0.9% by mass or less or 0.8% by mass or less. There may be a limit on the modification effect when the concentration is set higher. Further, when the concentration is too high, micelles may be formed by self-aggregation of the copolymer itself, which may prevent modification. When modifying polyethylene, the SCCBC is easily adsorbed on the polyethylene and is adsorbed in a considerable amount, so it is easy to modify even if the concentration is high. However, when the polypropylene is the modification target, the amount of polypropylene adsorbed is poor, so it is preferable to set the upper limit to be lower.

The contact between the copolymer solution and the polypropylene resin molded body can be carried out by, for example, dipping the portion to be modified in the copolymer solution, contacting (spraying, etc.) while circulating the solution, or coating with the solution.

The contact time of the polypropylene resin molded body with the copolymer solution having a predetermined heating temperature can be appropriately set within a range that enables modification by the copolymer. The contact time is preferably 1 second to 60 minutes. The lower limit of this time may be 2 seconds or more, 5 seconds or more, 10 seconds or more, 30 seconds or more, or 1 minute or more. If the contact time is too short, the copolymer layer may not be sufficiently obtained and the modification effect may be insufficient. The upper limit of the contact time may be 50 minutes or less, 40 minutes or less, 30 minutes or less, or 20 minutes or less. There may be a limit on the effect when the contact time is extended. If the contact time is too long, since there may be cases in which a solvent that erodes the polypropylene resin molded body is used, the polypropylene resin molded body may be dissolved or deformed if brought into contact for a long time.

The present invention comprises a step of contacting the copolymer solution and the polypropylene resin molded body with each other at a heating temperature of the copolymer solution of 40 to 120° C. The heating temperature is preferably 50 to 100° C. By contacting at such a temperature, the polypropylene resin molded body can be modified by the copolymer of the present invention.

The lower limit of the heating temperature in this contacting step is preferably a temperature higher than 40° C. Further, the lower limit may be 45° C. or more, 50° C. or more, 60° C. or more, or 65° C. or more. If the temperature of the copolymer solution is low, the layer of the copolymer solution may not be provided on the polypropylene resin molded body, or even if the layer is formed, adhesiveness may be poor and the layer peels off.

The upper limit of the heating temperature in the contacting step may be 115° C. or less, 110° C. or less, 100° C. or less, 95° C. or less, or 90° C. or less. If the temperature of the copolymer solution is high, the heat resistance of the polypropylene resin molded body in the solution may be insufficient, and the polypropylene resin molded body may deform or dissolve in the solvent. However, it is possible to limit those effects and sufficiently modify the polypropylene resin molded body by shortening the contact time.

The present invention only needs to comprise the step of contacting the polypropylene resin molded body with the copolymer solution at such a predetermined temperature, but the present invention may also have a step of contacting the polypropylene resin molded body with the copolymer solution at a temperature lower than the lower limit.

When performing the contacting step at a predetermined temperature as described above, the copolymer solution may be kept at the predetermined temperature in advance. Alternatively, the polypropylene resin molded body may be contacted with a copolymer solution at about room temperature and then heated to raise the temperature to the predetermined temperature. Further, after the contacting step at a predetermined temperature, the polypropylene resin molded body may be immediately removed from the copolymer solution, or may be cooled or gradually cooled while still being in contact.

Contact is carried out by dipping the polypropylene resin molded body in the copolymer solution, or by coating the polypropylene resin molded body with the copolymer solution at any position with coating means such as a brush, a spray, or a coater. It is preferable to dip in the copolymer solution in a way in which it is easy to manage the copolymer solution at the predetermined temperature.

Further, after finishing the contacting step, the modified polypropylene resin molded body may be used as it is, or may be further treated (for example, plated) before use. After the contacting step, depending on the modified polypropylene resin molded body, the solvent of the coating film of the copolymer solution provided on the polypropylene resin molded body may be removed or further treatment may be performed. In the case of removing the solvent, the polypropylene resin molded body may be dried at around room temperature in an environment with good air ventilation, or may be appropriately dried under reduced pressure.

[Modified Polypropylene Resin Molded Body]

The molded body of the present invention relates to a modified polypropylene resin molded body having a side chain crystalline block copolymer site in at least a part of its surface, wherein the side chain crystalline block copolymer layer remains during contact with the solvent. Since the molded body of the present invention is obtained by the above-described production method of the present invention, the molded body has a structure in which a copolymer site is provided in the polypropylene resin molded body. The copolymer site provided in the molded body may be appropriately adjusted so as to be, for example, a layer, a patch, a stripe, or a hole in a porous layer or the like in the surface of the molded body. The whole surface of the polypropylene resin molded body may be the site to be modified.

Whether a molded body is the molded body of the present invention can be confirmed by a method such as component analysis of each layer by FT-IR or component analysis of a cut cross-section. Since the copolymer of the present invention and the polypropylene resin molded body are adhered to each other, the side chain crystalline block copolymer remains even when treated by contacting the solvent.

Since at least part of such an adhered side chain crystalline block copolymer exists, the polypropylene resin molded body can be modified by the side chain crystalline block copolymer. The modification can be controlled by the functional group of the side chain crystalline block copolymer.

To confirm that the copolymer of the present invention is adhered, butyl acetate can be used as the contacting solvent. The molded body of the present invention can be dipped in the solvent, or the portion to be inspected can be coated with the solvent, and after about 5 minutes have passed, evaluation of whether or not the side chain crystalline block copolymer remains can be performed by FT-IR analysis.

Further, by performing TEM observation on a cross section near the surface of the polypropylene resin molded body, it is possible to confirm the polypropylene serving as the base material and the side chain crystalline block copolymer layer closely adhered to the polypropylene in a manner in which parts of the copolymer penetrate into the polypropylene while other portions are stretched out.

In the molded body of the present invention, the side chain crystalline block copolymer may contain a good solvent for the side chain crystalline block copolymer. If the method for producing the molded body of the present invention is used to produce the molded body of the present invention, the solvent that is suitably used is a good solvent, and in some cases is not completely removed and may remain after production. Since this good solvent may contribute to the adhesion, the evaluation regarding whether the molded body is the molded body of the present invention exhibiting excellent adhesion can be carried out by confirming that this good solvent is contained.

[Plating Steps]

Plating treatment can be performed on the polypropylene resin molded body modified according to the present invention. The plating of the polypropylene resin molded body modified according to the present invention is carried out by utilizing the fact that the structure derived from the monomer (A) of the copolymer used in the present invention stably adheres, and the fact that the structure derived from the monomer (B) adheres to the metal for plating. Generally, it is said that it is difficult to plate polypropylene resin molded bodies, and polypropylene resin molded bodies are non-conductive materials.

Since the plating is carried out on a non-conductive material, a representative example of such plating is self-catalytic electroless plating. In some cases, electrolytic plating may further be carried out. Examples of typical plating methods carried out in electroless plating that can be used for the plating of the present invention include nickel plating and copper plating.

The plating treatment can be carried out on the polypropylene resin molded body modified according to the present invention. Examples of the specific steps include the following steps carried out on the polypropylene resin molded body modified by the method for modifying a polypropylene resin molded body of the present invention.

(Plating step 1) A surface layer catalyzing step of providing a nanometal layer on a polypropylene resin molded body modified according to the present invention by contacting the polypropylene resin molded body with a nanometal dispersion or a metal catalyst solution.

(Plating step 2) A plating treatment step of providing a plating treatment layer on the polypropylene resin molded body with the nano metal layer arranged there-between by performing an electroless plating treatment on the polypropylene resin molded body provided with the nano metal layer.

The side chain crystalline block copolymer to be used in the present invention can be designed and used as a plating aid. This plating aid is prepared so that the layer of the copolymer of the present invention can be easily provided at an arbitrary place to serve as the plating place of the polypropylene resin molded body. For example, the copolymer of the present invention is appropriately mixed with a solvent or the like in which it can be dispersed or dissolved to obtain a plating aid solution. Although this solvent depends on the specific structure of the copolymer, it is preferable to use the solvent to be used in the treatment by the modification method of the present invention. The concentration at that time is also adjusted in the same manner.

The plating layer can be obtained by employing a technique such as electroless plating by using the copolymer layer of the resin molded body modified according to the present invention and provided with the site of the copolymer. As a representative step, first, the above-described (Plating step 1) is performed, and then, (Plating step 2) is further performed. As a result, a stable plating layer can be provided on the surface layer of the polypropylene resin molded body.

By using such a copolymer or plating aid of the present invention, the present invention can also provide a polypropylene resin molded body having the site of the copolymer and the plating layer. Since the molded body having this plating layer can be obtained by the above-described production method, the molded body has a configuration in which the polypropylene resin molded body, the site of the copolymer, and the plating layer are arranged in that order. Further, the fact that a molded body is such a molded body can be confirmed by a method such as analyzing while peeling each layer, or analyzing the components of a cut cross-section.

[Dyeing Step]

The polypropylene resin molded body modified according to the present invention can be dyed. More specifically, the present invention also relates to a method for dyeing a polypropylene resin molded body, comprising a dyeing step of contacting a polypropylene resin molded body modified by the method for modifying a polypropylene resin molded body of the present invention with a dye to provide a dye layer on the polypropylene resin molded body.

Polypropylene is generally considered not dyeable. However, a polypropylene resin molded body modified according to the present invention can be dyed by utilizing the fact that the structure derived from the monomer (A) of the copolymer used in the present invention stably adheres, and the fact that the structure derived from the monomer (B) contributes to dye binding.

The dye is an organic dye that dissolves or disperses in water. Since the dye molecule is water-soluble or hydrophilic, a dye having a salt structure, for example, in which a sulfo group or a cation group has been introduced, is used as the dye.

Dyes are classified based on their dyeing method into direct dyes, vat dyes, sulfur dyes, reactive dyes, acid dyes, metal complex hydrochloric acid dyes, disperse dyes, basic dyes, fluorescent brighteners, and the like. The present invention can use these dyes as appropriate.

Dyes are classified based on their chemical structure into azo dyes, quinoline dyes, stilbene dyes, polymethine dyes, triarylmethane dyes, anthraquinone dyes, acridine dyes, indigo dyes, and the like. The present invention can use these dyes as appropriate.

Although the binding mode may differ depending on how each dye is classified based on its dyeing method or chemical structure, the modification method of the present invention can provide a polypropylene resin molded body with a structure that contributes to a binding mode suitable for each dye based on the design of the monomer (B).

Using these dyes, the dyeing method is carried out by contacting a polypropylene resin molded body modified by the method for modifying a polypropylene resin molded body of the present invention with a dye to provide a dye layer on the polypropylene resin molded body. In the case of a direct dye, contact with the dye is carried out by directly bringing into contact with the dye and post-treating with copper sulfate or the like to improve fastness as appropriate, preparing a solution suitable for each dye, performing a pre-treatment or post-treatment, and the like to enable dyeing according to the dyeing method of each dye to be carried out.

According to the present invention, for example, there can be provided molded bodies having various characteristics, such as a polypropylene resin molded body having a surface layer exhibiting hydrophilicity, a plated polypropylene resin molded body, a polypropylene resin molded body having excellent adhesiveness, and a dyed polypropylene resin molded body. Due to these characteristics, the molded body can be used in a wider range of applications than conventionally.

EXAMPLES

The present invention will now be described in more detail with reference to Examples, but to the extent that the gist thereof is not changed, the present invention is not limited to the following Examples.
1. Adhesion Test
The below films were molded as a polypropylene resin molded body of a base material, and an adhesion test was performed using an adhesive.
[Base Material]
The base material was molded using the following resins. In each of the films, an appropriate amount of a PP resin was placed in a spacer having a thickness of 0.5 mm and press-molded at 210° C. and 25 MPa to obtain a film having a spacer thickness. Only the HDPE was press-molded at 180° C. and 25 MPa for 2 minutes.
[Homo PP Film]
PP resin: manufactured by Prime Polymer Co., Ltd., Prime Polypro J137G (MI=30 g/10 minutes)
[Random PP Film]
PP resin: manufactured by Prime Polymer Co., Ltd., Prime Polypro B241 (MI=0.5 g/10 minutes)
[Block PP Film]
PP resin: manufactured by Prime Polymer Co., Ltd., Prime Polypro B-150, (MI=0.5 g/10 minutes)
[HDPE Film]
High-density PE resin: manufactured by Keiyo Polyethylene Co., Ltd., FX201, MI=13 g/10 minutes
<Evaluation Items>
[IR Spectrum]
The IR spectrum was measured using a Fourier transform infrared spectroscopic analyzer "Spectrum Two®" manufactured by Perkin Elmer.
[Peel Test]
A T-peel test was conducted according to JIS K6854-3 (1999) to evaluate adhesiveness. A cyanoacrylate adhesive (trade name: Aron Alpha 201, manufactured by Toagosei Co., Ltd.) was used as the adhesive. As the test apparatus, a compact tabletop tester EZ-LX manufactured by Shimadzu was used. The test specimen width was 12.5 mm, the adhesion length was 75 mm, and the non-adhesion portion was 25 mm.
(Peel Test)
The non-adhesion portion of the test specimen was arranged so as to be in a T-direction, both ends of the test specimen were held by a holding device of the measuring apparatus, and pulled in the peeling direction at 10 mm/min to measure the adhesive force.
(Evaluation)
In cases where the adhesion surface peeled off in the peel test, the average peel force, the maximum peel force, and the minimum peel force for a movement distance of 50 to 110 mm from the start of tension, and the maximum load over the entire measurement range, were determined.
In cases where the PP film was destroyed broken in the peel test due to strong adhesion, the maximum load was determined.

[Tensile Shear Test]
A tensile shear test was conducted according to JIS K6850 (1999) to evaluate adhesiveness. A cyanoacrylate adhesive (trade name: Aron Alpha 201, manufactured by Toagosei Co., Ltd.) was used as the adhesive. As the test apparatus, a compact tabletop tester EZ-LX manufactured by Shimadzu was used. The test specimen width was 25 mm, the length was 100 mm, and the adhesion length was 12.5 mm.
(Peel Test)
Both ends of the test specimen were held by a holding device of the measuring apparatus, and pulled in the peeling direction at 10 mm/min to measure the adhesive force.
(Evaluation)
The peel test was carried out five times, and the average value of the maximum load over the entire measurement range was determined.
<Production of Polymer>
[Raw Materials]
[Monomer (A)]
Monomer (A-1-1): BHA
Behenyl acrylate was used. This monomer is a monomer having an alkane chain having 22 carbon atoms in a side chain.
[Monomer (B)]
Monomer (B-1-1): TBAEMA
2-(Tert-butylamino)ethyl methacrylate (TBAEMA) was used. This monomer is a monomer having an amine in a side chain and a methacrylate structure as the main chain.
[Polymerization Initiator] Bloc Builder® MA (Manufactured by Arkema)
[Solvent] Butyl acetate
[Design of Copolymer for Adhesiveness Modification of PP Resin]
An attempt was made to design a copolymer (1) to be used for imparting adhesiveness functionality to a molded body made of polypropylene resin. First, in order to obtain adhesiveness with a polypropylene resin molded body, BHA (monomer (A-1-1)), which is an acrylate having an alkane chain having 22 carbon atoms as a side chain, was selected. Next, the monomer (B-1-1), which is an acrylate having an amine side chain, was selected as a monomer capable of exhibiting adhesiveness with a cyanoacrylate adhesive. Then, using these selected monomers, the copolymer (1) for imparting adhesiveness to the polypropylene resin molded body was produced.
[Preparation of Copolymer (1)]
A block polymer of BHA (monomer (A-1-1)), which is the first monomer (A), was prepared by subjecting a solution obtained by mixing 5.0 g of BHA, 5.0 g of butyl acetate, and 0.38 g of an initiator to living radical polymerization under a nitrogen atmosphere at a polymerization temperature of about 110° C. and a reactor stirring speed of 80 rpm. Further, 5.0 g of TBAEMA (monomer (B-1-1)), which is the second monomer (B), and 5.0 g of butyl acetate were added to the solution of the BHA block polymer obtained thereby to obtain a copolymer (1), which is a block copolymer of the monomer (A-1-1) and the monomer (B-1-1). The structural formula of this copolymer (1) is shown as formula (I).
The molecular weight (Mw: weight average molecular weight) of the obtained copolymer (1) was measured by GPC and calculated in terms of polystyrene. The copolymer (1) was a copolymer in which the structure derived from the monomer (A-1-1) had an estimated value of about 8,000 (g/mol), and the structure derived from the monomer (B-1-1) had an estimated value of about 8,000 (g/mol). IR spectrum analysis showed that the copolymer (1) (SCCBC)

had peaks derived from both of the raw material monomers, from which it could be confirmed that the copolymer (1) was a copolymer.

[Formula 2]

[Basic Treatment Conditions]
Polypropylene resin molded body modification was conducted by preparing the following solution and performing a dipping treatment. As the basic treatment conditions of the solution preparation and dipping treatment, the following solvent, copolymer concentration, dipping temperature, and dipping time were examined as the basic conditions.
Solvent: Xylene
Copolymer: Copolymer (1) (SCCBC of BHA/TBAEMA)
Copolymer concentration: 0.1% by mass
Dipping temperature: 80° C.
Dipping time: 10 minutes
[Preparation of Copolymer Solution (Solution Preparation)]
The copolymer obtained by the method described above was mixed with xylene as a solvent, and dissolved and dispersed by stirring to prepare a copolymer solution. The copolymer concentration in the copolymer solution is given in terms of % by mass of the copolymer in the entire solution.
[Modification Step (Dipping Step)]
A PP film was washed with acetone to clean the surface. Next, the PP film was dipped for a dipping time of 10 minutes in the copolymer solution heated to a dipping temperature of 80° C. Immediately after the dipping time had elapsed, the PP film was taken out of the solution. The PP film was then air dried for one day.

Test Example 1-1 (Experiment Under Basic Treatment Conditions)

A modified PP film (1) was obtained by modifying the homo PP film with the copolymer (1) under the above-mentioned basic treatment conditions.
The modified PP film (1) was subjected to a T-peel test and a tensile shear test. The results are shown in Table 1.

Figure 1:
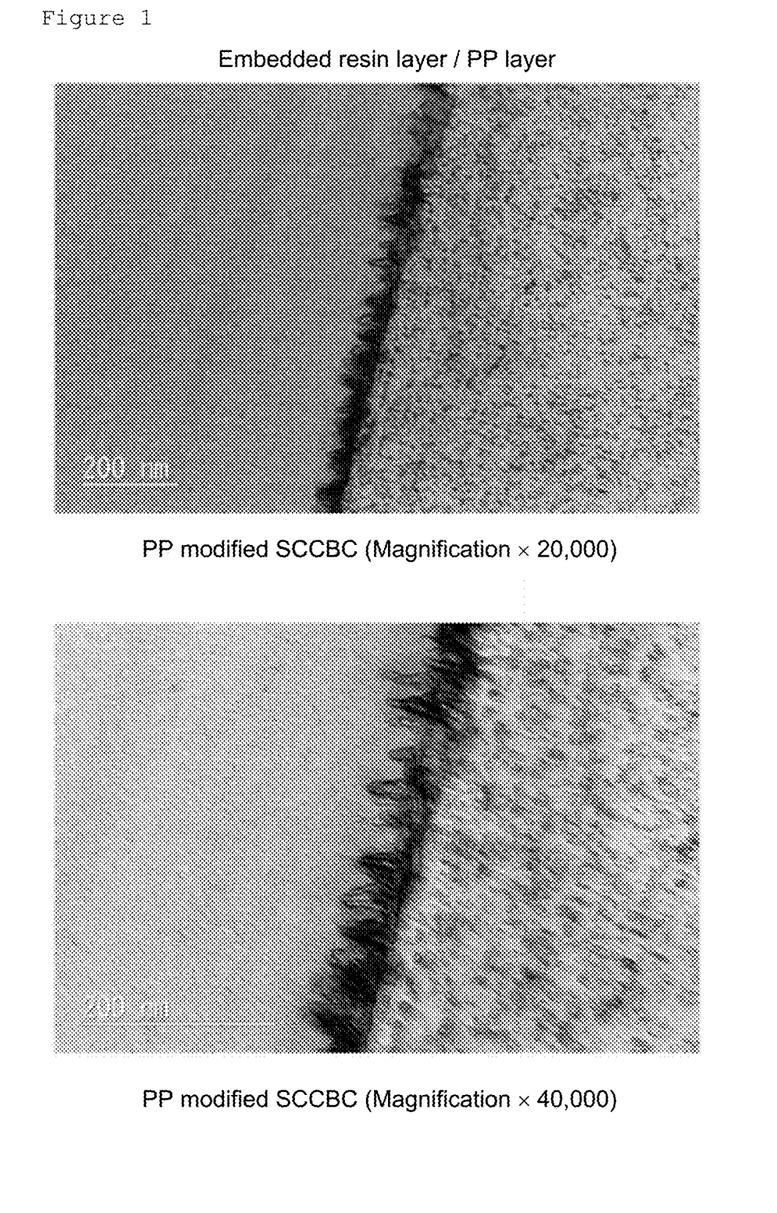
FIG. 1 is a TEM observation image of a modified PP film according to an Example of the present invention.

Further, the results of TEM observation of a modified PP film produced in accordance with the production of modified PP film (1) with a dipping time of 5 minutes are shown in FIG. 1.

As shown in FIG. 1, by performing TEM observation on a cross section near the surface of the polypropylene resin molded body, it is possible to confirm the polypropylene serving as the base material and the side chain crystalline block copolymer layer closely adhered to the polypropylene in a manner in which parts of the copolymer penetrate into the polypropylene.

As a result of IR spectrum analysis of the modified PP film according to Test Example 1-1, a copolymer (1) peak was observed. From this, it was confirmed that a layer of the copolymer (1) was provided on the PP film.

Figure 2:
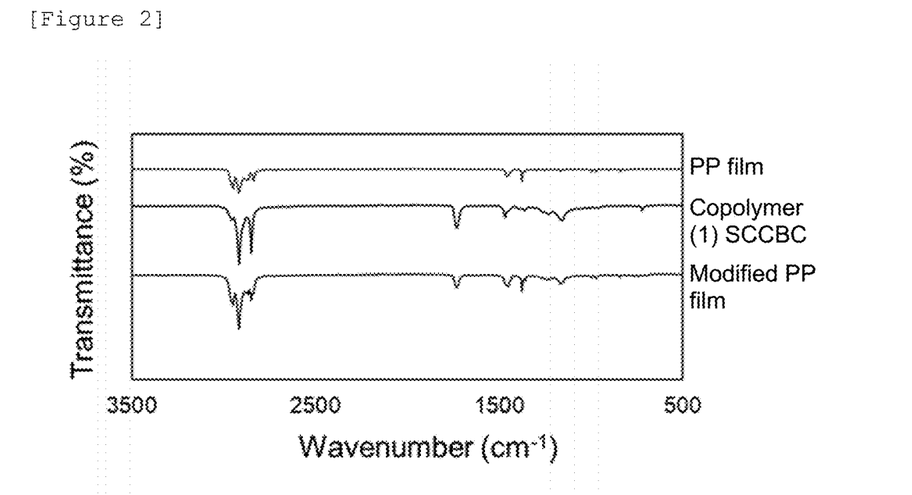
FIG. 2 is a graph showing an IR analysis result of the modified PP film according to an Example of the present invention.

Further, the modified PP film according to Test Example 1-1 was dipped in xylene for 5 minutes, dried, and then subjected to IR spectrum analysis. As a result, a peak of the copolymer (1) was observed (FIG. 2). From this, it was confirmed that a modified PP film having a layer of the copolymer (1) having high adhesion formed on the PP film was obtained.

Test Example a (Adhesiveness of PP Film)

A T-peel test and a tensile shear test were performed using the homo PP film before modification treatment had been performed. The results are shown in Table 1.

TABLE 1

|  | T-peel test (maximum load) | Tensile shear test (maximum load) |
| --- | --- | --- |
| Test Example 1-1 (modified PP film (1)) | 25N (film destroyed) | 322N |
| Test Example A (untreated homo PP film) | 0.4N | 57N |

The PP film according to Test Example 1-1 modified according to the present invention can be firmly adhered with a cyanoacrylate adhesive. This is clear from the results of both the T-peel test and the tensile shear test, and there was a significant difference compared to the PP film shown in Test Example A. The test specimen according to Test Example A had a small increase in tension, and the test ended because the test specimen peeled off.

Test Example 1-2 to Test Example 1-6

Based on the above-described basic treatment conditions, modification treatment conditions such as the solvent, the copolymer concentration, the dipping temperature, and the dipping time were investigated. In addition, a test for confirming adhesiveness when the base material was changed was conducted.

[Test Example 1-2] Dipping Temperature

The dipping temperature was investigated based on the above-described basic treatment conditions. The following table shows the dipping temperatures and the results of T-peel tests and tensile shear tests of the PP films treated at those dipping temperatures.

TABLE 2

| Dipping temperature | T-peel test (maximum load) | Tensile shear test (maximum load) |
| --- | --- | --- |
| 20° C. | 0.9N | 145N |
| 60° C. | 25N (film destroyed) | 321N |
| 80° C. | 25N (film destroyed) | 322N |
| 100° C. | 23N (film destroyed) | 300N |

[Test Example 1-3] Dipping Time

The dipping time was investigated based on the above-described basic treatment conditions. The following table shows the dipping times and the results of T-peel tests and tensile shear tests of the PP films treated for those dipping times.

TABLE 3

| Dipping time | T-peel test (maximum load) | Tensile shear test (maximum load) |
| --- | --- | --- |
| 10 seconds | 25N (film destroyed) | 328N |
| 1 minute | 25N (film destroyed) | 320N |
| 5 minute | 25N (film destroyed) | 322N |
| 10 minute | 25N (film destroyed) | 322N |
| 30 minute | 26N (film destroyed) | 307N |

[Test Example 1-4] Copolymer Solution Concentration

The copolymer solution concentration was investigated based on the above-described basic treatment conditions. The test was conducted by changing the dipping time to 5 minutes. The following table shows the copolymer solution concentrations and the results of T-peel tests and tensile shear tests of the PP films treated at those concentrations.

TABLE 4

| Concentration | T-peel test (maximum load) | Tensile shear test (maximum load) |
| --- | --- | --- |
| 0.05 by mass % | 25N (film destroyed) | 315N |
| 0.1 by mass % | 25N (film destroyed) | 323N |
| 0.5 by mass % | 11N | 241N |

[Test Example 1-5] Solvent of Copolymer Solution

The solvent of the copolymer solution was investigated based on the above-described basic treatment conditions. The test was conducted by changing the dipping time to 5 minutes. The following table shows the used solvents and the results of T-peel tests and tensile shear tests of the PP films treated with those solvents.

TABLE 5

| Solvent | T-peel test (maximum load) | Tensile shear test (maximum load) |
| --- | --- | --- |
| Octane | 25N (film destroyed) | 323N |
| Xylene | 25N (film destroyed) | 323N |
| Decalin | 12N (film destroyed) | 279N |
| Butyl acetate | 13N (film destroyed) | 278N |

[Test Example 1-6] Change of Base Material

Based on the above basic treatment conditions, a modified random PP film was obtained using the random PP film as the base material. Similarly, a modified block PP film was obtained using the block PP film as the base material. Similarly, a modified HDPE film was obtained using the HDPE film as the base material. The modification temperature was set as follows according to the basic treatment conditions: homo PP film 80° C., block PP film 65° C., random PP film 65° C., HDPE film 100° C.

Further, similar to Test Example 1-1, the adhesiveness between the base materials was tested for the following combinations. The results of the T-peel tests and tensile shear tests are shown in the following table.

TABLE 6

| Combination | T-peel test (maximum load) | Tensile shear test (maximum load) |
| --- | --- | --- |
| Modified homo PP film and modified HDPE film | 12N | 198N |
| Modified homo PP film and modified HDPE film | 83N | 176N |
| Modified homo PP film and modified random PP film | 85N | 196N |

2. Dyeing Test

A dyeing test was conducted using the following PP fiber as a polypropylene resin molded body.

[Base Material]

PP Fiber (1)

Fiber made of polypropylene (trade name: Nonwoven fabric for agriculture, manufactured by MonotaRO)

[Dyeing Test]

Test agent for dyeing: Kayastain Q

Kayastain Q (Shikisensha Co., Ltd.), which is a dye for identifying dyeing test articles, was used.

Dyeing Test Step

A dyeing solution was prepared by dissolving 5 g of Kayastain Q in 500 g of water at 70° C. The base material was sufficiently moistened with 70° C. water, then dipped in the dyeing solution and boiled for 5 minutes to dye the base material. After boiling, the base material was taken out of the dyeing solution, rinsed with water, and dried at room temperature.

Preparation of Modified PP Fiber (1)

A modified PP fiber (1) was obtained by treating the PP fiber (1) under the above-described polypropylene resin molded body basic treatment conditions, and modifying with the copolymer (1).

[Test Example 2-1] Dyeing of PP Fiber

Figure 3:
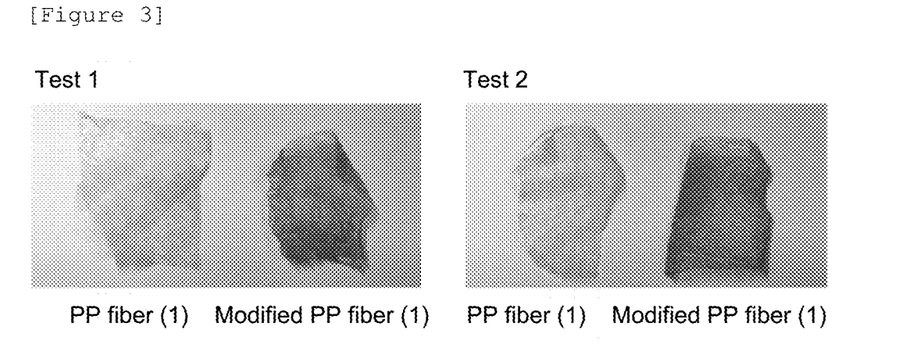
FIG. 3 is an image of a dyeing result obtained using modified PP fibers according to an Example of the present invention.

A dyeing test with Kayastain Q was conducted using the PP fiber (1) before modification and the modified PP fiber (1). The test was carried out twice on each fiber, and the obtained test specimens are shown in FIG. 3.

In each case, it was clear that the PP fiber (1) before modification was not dyed and still had the yellowish white color of the PP fiber, thus showing poor dyeability. On the other hand, the modified PP fiber (1) was dyed with the Kayastain Q, and had a blue-green color.

Based on the color hue of Kayastain Q, a material dyed in this color by Kayastain Q is equivalent to hemp or wool. Hemp and wool are said to be suitable for dyeing with direct dyes and acid dyes, and are considered to have a binding mode in which a neutral salt or an acid promotes binding. Therefore, it is thought that the fiber is modified by the treatment using the copolymer (1) due to tert-butylamino groups derived from TBAEMA (monomer (B-1-1)) being arranged around the PP fiber (1), thus enabling dyeing equivalent to that of hemp or wool to be achieved.

3. Plating Test

A plating test was conducted using the homo PP film as the polypropylene resin molded body.

[Monomer (A)]
  Monomer (A-1-1): BHA
  Behenyl acrylate
[Monomer (B)]
  Monomer (B-1-1): TBAEMA
  2-(Tert-butylamino)ethyl methacrylate
  Monomer (B-3-1): DEAEA
  2-(Diethylamino)ethyl acrylate
  Monomer (B-3-2): DMAEA
  2-(Dimethylamino)ethyl acrylate
  Monomer (B-3-3): PGMA
  Poly(ethylene glycol) monoacrylate
[Palladium Catalyst] "Enplate Activator 444" (Meltex Inc.)
[Electroless Copper Plating Bath] "Melplate CU-390" (Meltex Inc.)

[Design of Copolymer for Plating Aid]

An attempt was made to design a copolymer (3-1) to be used as an aid for plating a polypropylene resin molded body. First, in order to obtain adhesiveness with a polypropylene resin molded body, BHA (monomer (A-1-1)), which is an acrylate having an alkane chain having 22 carbon atoms as a side chain, was selected. Next, the monomer (B-1-1), which is an acrylate having an amine side chain, was selected as a monomer having metal adsorbability. Then, using these selected monomers, the copolymer (3-1) to be used as an aid for plating a polypropylene resin molded body was produced.

[Preparation of Copolymer (3-1)]

A block polymer of BHA (monomer (A-1-1)), which is the first monomer (A), was prepared by subjecting a solution obtained by mixing 6.7 g of BHA, 6.7 g of butyl acetate, and 0.385 g of an initiator to living radical polymerization under a nitrogen atmosphere at a polymerization temperature of about 105° C. and a reactor stirring speed of 75 rpm. Further, 3.61 g of TBAEMA (monomer (B-1-1)), which is the second monomer (B), and 3.76 g of butyl acetate were added to the solution of the BHA block polymer obtained thereby to obtain a copolymer (3-1), which is a block copolymer of the monomer (A-1-1) and the monomer (B-1-1). The structural formula of this copolymer (3-1) is the formula (I) described above. The molecular weight (Mw: weight average molecular weight) of the obtained copolymer (3-1) was measured by GPC and calculated in terms of polystyrene. The copolymer (3-1) was a copolymer having an Mw/Mn of 1.1 in which the structure derived from the monomer (A-1-1) had an estimated value of about 6,000 (g/mol), and the structure derived from the monomer (B-1-1) had an estimated value of about 2,000 (g/mol). IR spectrum analysis showed that the copolymer (3-1) (SCCBC) had peaks derived from both of the raw material monomers, from which it could be confirmed that the copolymer (3-1) was a copolymer.

[Preparation of Copolymer (3-2)]

A copolymer (3-2) was produced according to the preparation of the copolymer (3-1) by using DEAEA (monomer (B-3-1)) instead of the TBAEMA (monomer (B-1-1)) used in the preparation of the copolymer (3-1). The copolymer (3-2) was a copolymer in which the structure derived from the monomer (A-1-1) had an estimated value of about 8,000 (g/mol), and the structure derived from the monomer (B-3-1) had an estimated value of about 2,000 (g/mol).

[Formula 3]

BHA

DEAEA

[Preparation of Copolymer (3-3)]

A copolymer (3-3) was produced according to the preparation of the copolymer (3-1) by changing the amount of the monomer added and using DMAEA (monomer (B-3-2)) instead of the TBAEMA (monomer (B-1-1)) used in the preparation of the copolymer (1). The copolymer (3-3) was a copolymer in which the structure derived from the monomer (A-1-1) had an estimated value of about 7,000 (g/mol), and the structure derived from the monomer (B-3-2) had an estimated value of about 1,500 (g/mol). A general formula of the copolymer (3-3) is shown below.

[Formula 4]

BHA

DMAEA

[Preparation of Copolymer (3-4)]

A copolymer (3-4) was produced according to the preparation of the copolymer (1) by changing the amount of the monomer added and using PGMA (monomer (B-3-3)) instead of the TBAEMA (monomer (B-1-1)) used in the preparation of the copolymer (1). The copolymer (3-4) was a copolymer in which the structure derived from the monomer (A-1-1) had an estimated value of about 3,000 (g/mol), and the structure derived from the monomer (B-3-3) had an estimated value of about 62,000 (g/mol). Further, IR analysis showed that the copolymer (3-4) (SCCBC) had peaks derived from both of the raw material monomers, from which it could be confirmed that the copolymer (3-4) was a copolymer. A general formula of the copolymer (3-4) is shown below. In particular, in the copolymer (3-4), the block having a structure derived from the monomer (B) tends to have a large molecular weight of 10,000 or more or 30,000 or more, and reached about 60,000. It is thought that the structure derived from this monomer (B) tends to contribute to plating adhesiveness. The copolymer (3-4) is excellent as a copolymer for a plating aid in terms of the fact that it is easy to produce with this structure having a large molecular weight.

[Formula 5]

BHA

PGMA

[Preparation of Copolymer Solution (Plating Aid Solution)]

The copolymer was mixed and stirred at 70° C. to dissolve in xylene as a solvent so that the concentration of the copolymer would be 0.1% by mass, to prepare a copolymer solution.

[Surface Modification Step (Modification Processing)]

A base material (PP film) was washed with acetone to clean its surface, then dipped in the copolymer solution at 80° C. for 5 minutes, and allowed to stand at room temperature to naturally dry, whereby a surface-modified base material was obtained. A copolymer layer was provided on the surface of the surface-modified base material.

[Surface Layer Catalyzing Step]

The surface-modified base material obtained by performing the above-described surface modification step was dipped for 10 minutes in Enplate Activator 444 adjusted to 35° C., then washed with water, and dipped for 1 minute in an aqueous solution of 0.1 N hydrochloric acid adjusted to 35° C., to thereby obtain a base material having a catalyzed surface layer.

[Plating Treatment Step]

The above-described surface layer catalyzing step was performed, and the base material having a catalyzed surface layer was dipped in an electroless copper plating bath adjusted to 35° C. for 20 minutes, whereby a plating layer was obtained on the surface of the base material.

Test Example 3-1 to Test Example 3-4

Using the copolymers (3-1)-(3-4), preparation of a copolymer solution (plating aid solution), the surface modification step (dipping treatment), the surface layer catalyzing step, and the plating treatment step were performed to produce a base material plated product. Table 7 shows a list of combinations.

TABLE 7

| | Base material | Copolymer |
|---|---|---|
| Test Example 3-1 | Homo PP film | Copolymer (3-1) BHA-TBAEMA |
| Test Example 3-2 | Homo PP film | Copolymer (3-2) BHA-DEAEA |
| Test Example 3-3 | Homo PP film | Copolymer (3-3) BHA-DMAEA |
| Test Example 3-4 | Homo PP film | Copolymer (3-4) BHA-PGMA |

[Plating Test Results]

Figure 4:
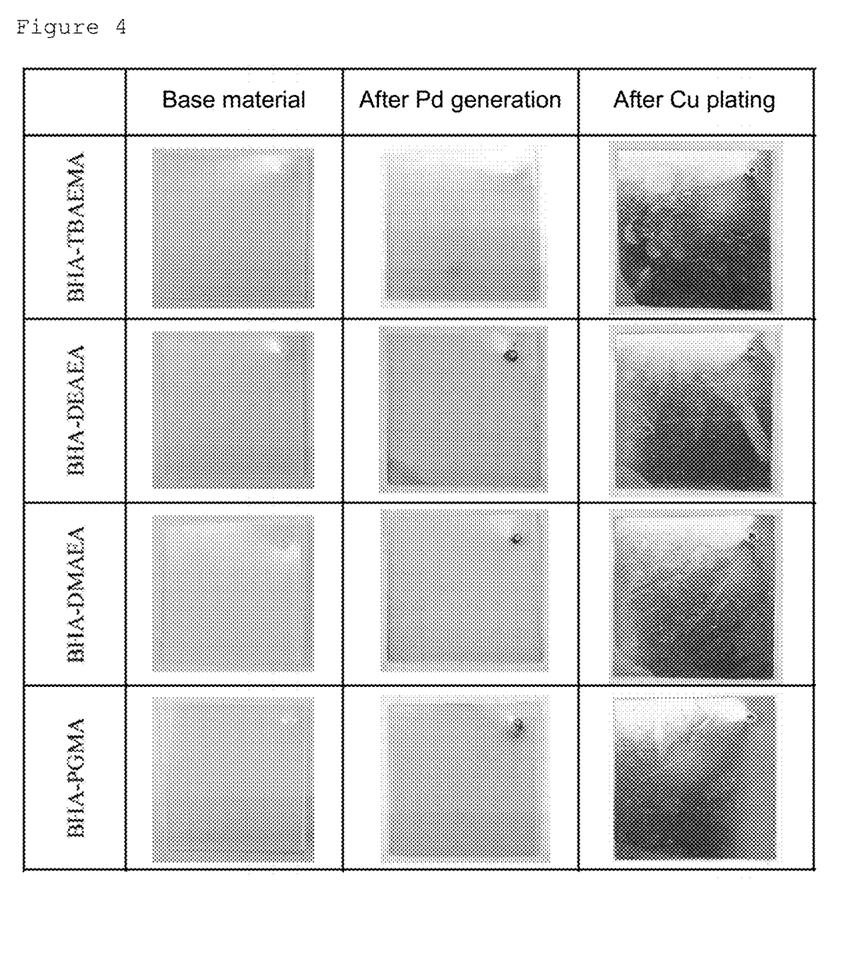
FIG. 4 is an image of a plating result of a modified PP film according to an Example of the present invention.

FIG. 4 shows the appearance of Test Example 3-1 to Test Example 3-4 in each step. For all of the test examples, it was possible to perform the plating treatment.

INDUSTRIAL AVAILABILITY

According to the present invention, a polypropylene resin molded body can be modified, and the polypropylene resin molded body can be used in a wider range of applications than conventionally, which is industrially useful.

The invention claimed is:

1. A method for modifying a polypropylene resin molded body, comprising a step of contacting a copolymer solution including a side chain crystalline block copolymer with a polypropylene resin molded body at a temperature of the copolymer solution of 40 to 120° C.,
   wherein the side chain crystalline block copolymer of the copolymer solution has a concentration in a range of 0.01% by mass or more and less than 0.5% by mass.

2. The method for modifying a polypropylene resin molded body according to claim 1, wherein
   the side chain crystalline block copolymer is a copolymer of a first monomer (A) and a second monomer (B),
   the monomer (A) is any monomer selected from the group consisting of (meth)acrylate, (meth)acrylamide, vinyl ether, vinyl ester, siloxane, and α-olefin, having an alkane side chain with a length of 8 or more carbon atoms in a side chain thereof,
   the monomer (B) is a monomer having a functional group, and the side chain crystalline block copolymer is a block copolymer having a monomer (A)-derived polymerized block, which is a polymerized portion of the monomer (A), and a monomer (B)-derived polymerized block, which is a polymerized portion of the monomer (B).

3. The method for modifying a polypropylene resin molded body according to claim 1, wherein a solvent of the copolymer solution is at least one or more solvents selected from the group consisting of an aromatic hydrocarbon solvent, a halogenated aromatic hydrocarbon solvent, an alcohol solvent, an ether solvent, a ketone solvent, an amide solvent, an ester solvent, an aliphatic hydrocarbon solvent, a halogenated aliphatic hydrocarbon solvent, dimethyl sulfoxide, and an ionic liquid.

4. The method for modifying a polypropylene resin molded body according to claim 1, wherein the polypropylene resin molded body is contacted with the copolymer solution at the temperature of the copolymer solution for a time of 1 second to 60 minutes.

5. The method for modifying a polypropylene resin molded body according to claim 2, wherein the functional group of the monomer (B) is a functional group having a polar group and/or a metal adsorbability.

6. The method for modifying a polypropylene resin molded body according to claim 5, wherein the monomer (B) is a monomer having, as a functional group having a polar group, any group selected from the group consisting of an oxyalkylene group, an amino group, an amide group, and a sulfo group.

7. The method for modifying a polypropylene resin molded body according to claim 5, wherein the monomer (B) is any monomer selected from the group consisting of (meth)acrylate, (meth)acrylamide, vinyl ether, vinyl ester, siloxane, and α-olefin, having, as a functional group having a metal adsorbability, an amine in a side chain thereof.

8. The method for modifying a polypropylene resin molded body according to claim 5, wherein the monomer (B) is any monomer selected from the group consisting of (meth)acrylate, (meth)acrylamide, vinyl ether, vinyl ester, siloxane, and α-olefin, having an oxiranyl group in a side chain thereof.

9. The method for modifying a polypropylene resin molded body according to claim 8, wherein a compound having a tertiary amine is reacted with the oxiranyl group derived from the monomer (B) of the side chain crystalline block copolymer to form a part of the oxiranyl group into a tertiary amine side chain serving as a functional group having a metal adsorbability.

10. The method for modifying a polypropylene resin molded body according to claim 5, wherein the monomer (B) is any monomer selected from the group consisting of (meth)acrylate, (meth)acrylamide, vinyl ether, vinyl ester, siloxane, and α-olefin, having, as a functional group having a metal adsorbability, an oxyalkylene group in a side chain thereof.

11. A method for performing a plating treatment on a polypropylene resin molded body, comprising:
   a surface layer catalyzing step of providing a nanometal layer on a polypropylene resin molded body modified by the method for modifying a polypropylene resin molded body according to claim 7 by contacting the polypropylene resin molded body with a nanometal dispersion; and
   a plating treatment step of providing a plating treatment layer on the polypropylene resin molded body with the nano metal layer arranged there-between by performing an electroless plating treatment on the polypropylene resin molded body provided with the nano metal layer.

12. A method for dyeing a polypropylene resin molded body, comprising a dyeing step of providing a dye adhesion site in a polypropylene resin molded body modified by the method for modifying a polypropylene resin molded body according to claim 1 by contacting the polypropylene resin molded body with a dye.

13. A modified polypropylene resin molded body comprising a base material of a polypropylene resin molded body and a site including a side chain crystalline block copolymer in at least a part of the base material.

14. The modified polypropylene resin molded body according to claim 13, wherein the site including the side chain crystalline block copolymer in at least a part of the base material remains after the side chain crystalline block copolymer comes into contact with a good solvent.

15. The modified polypropylene resin molded body according to claim 13, wherein the site including the side chain crystalline block copolymer contains a good solvent for the side chain crystalline block copolymer.

* * * * *